(12) United States Patent
Cho et al.

(10) Patent No.: US 8,405,807 B2
(45) Date of Patent: Mar. 26, 2013

(54) LIQUID CRYSTAL DISPLAY

(75) Inventors: Ting-Yi Cho, Taipei (TW); Chin-An Tseng, Taipei (TW); Yen-Heng Huang, Taipei County (TW); Chia-Hui Pai, Taichung (TW); Wen-Hsien Tseng, Taichung (TW); Chung-Kai Chen, Taichung County (TW); Chung-Yi Chiu, Tainan County (TW)

(73) Assignee: Au Optronics Corporation, Hsinchu (TW)

( * ) Notice: Subject to any disclaimer, the term of this patent is extended or adjusted under 35 U.S.C. 154(b) by 312 days.

(21) Appl. No.: 12/702,305

(22) Filed: Feb. 9, 2010

(65) Prior Publication Data
US 2011/0149183 A1  Jun. 23, 2011

(30) Foreign Application Priority Data
Dec. 17, 2009 (TW) .............................. 98143386 A

(51) Int. Cl.
*G02F 1/1343* (2006.01)
*G02F 1/1335* (2006.01)
*G02F 1/1337* (2006.01)
*G02F 1/1339* (2006.01)
(52) U.S. Cl. ........... 349/129; 349/38; 349/106; 349/155
(58) Field of Classification Search .................. 349/129, 349/38, 106, 155–157
See application file for complete search history.

(56) References Cited

U.S. PATENT DOCUMENTS

| 6,954,251 | B2 | 10/2005 | Nam et al. | |
| 7,206,057 | B2 | 4/2007 | Yoo et al. | |
| 2002/0012083 | A1* | 1/2002 | Tanaka et al. | 349/106 |
| 2005/0099579 | A1* | 5/2005 | Yoo et al. | 349/155 |
| 2006/0006385 | A1 | 1/2006 | Park | |
| 2006/0044502 | A1* | 3/2006 | Takagi | 349/129 |
| 2006/0187401 | A1* | 8/2006 | Yun et al. | 349/158 |
| 2008/0185589 | A1* | 8/2008 | Shin et al. | 257/59 |
| 2009/0268114 | A1 | 10/2009 | Wang et al. | |

FOREIGN PATENT DOCUMENTS

| EP | 1939676 | 7/2008 |
| EP | 1956426 | 8/2008 |

OTHER PUBLICATIONS

"Extended Search Report of Europe Counterpart Application", issued on Nov. 11, 2010, p. 1-p. 10.
"Office Action of Taiwan counterpart application" issued on Nov. 13, 2012, p1-p10, in which the listed reference was cited.

* cited by examiner

*Primary Examiner* — Jessica M Merlin
(74) *Attorney, Agent, or Firm* — Jianq Chyun IP Office

(57) ABSTRACT

A liquid crystal display including an active device array substrate, an opposite substrate disposed above the active device array substrate, a liquid crystal layer disposed between the active device array substrate and the opposite substrate, and spacers is provided. The active device array substrate includes a substrate, pixels, a first dielectric layer and color filter patterns. Each pixel includes a first active device, a first pixel electrode and a capacitor electrode. The capacitor electrode and the first pixel electrode constitute a storage capacitor. The first dielectric layer covers the first active device. The color filter patterns are disposed on the first dielectric layer. Each of the color filter patterns has a first opening disposed above the capacitor electrode to expose the first dielectric layer above the capacitor electrode. Each first pixel electrode is respectively disposed on one of the color filters and within the corresponding first opening.

24 Claims, 14 Drawing Sheets

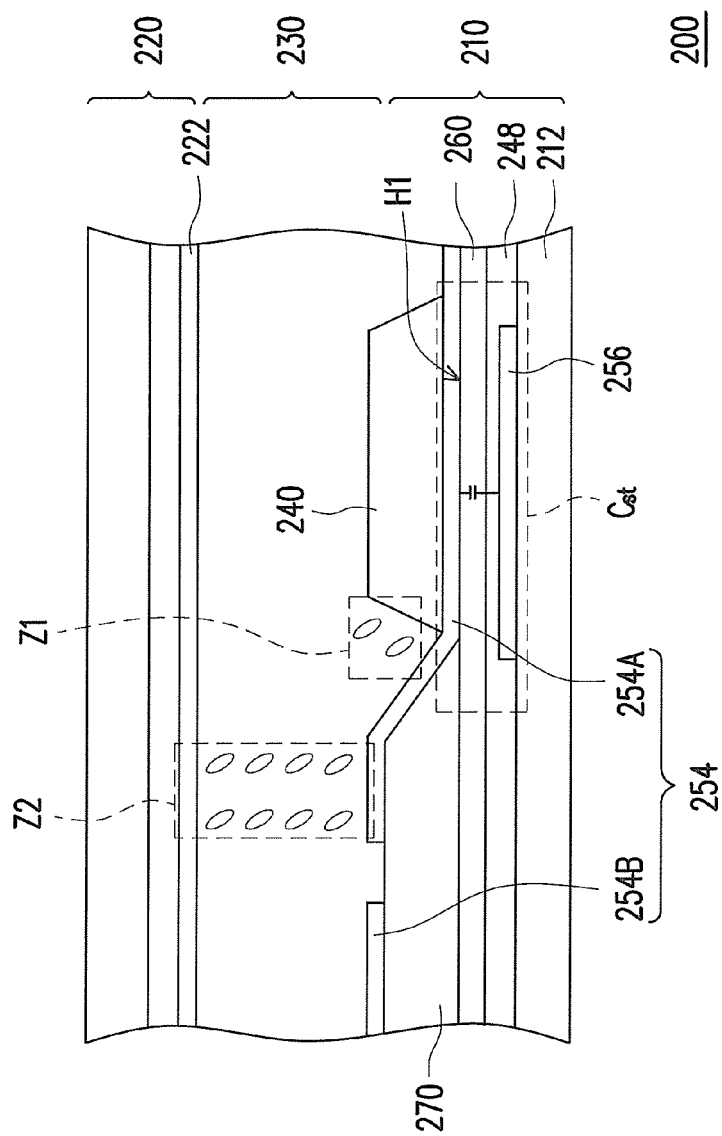
FIG. 2A"

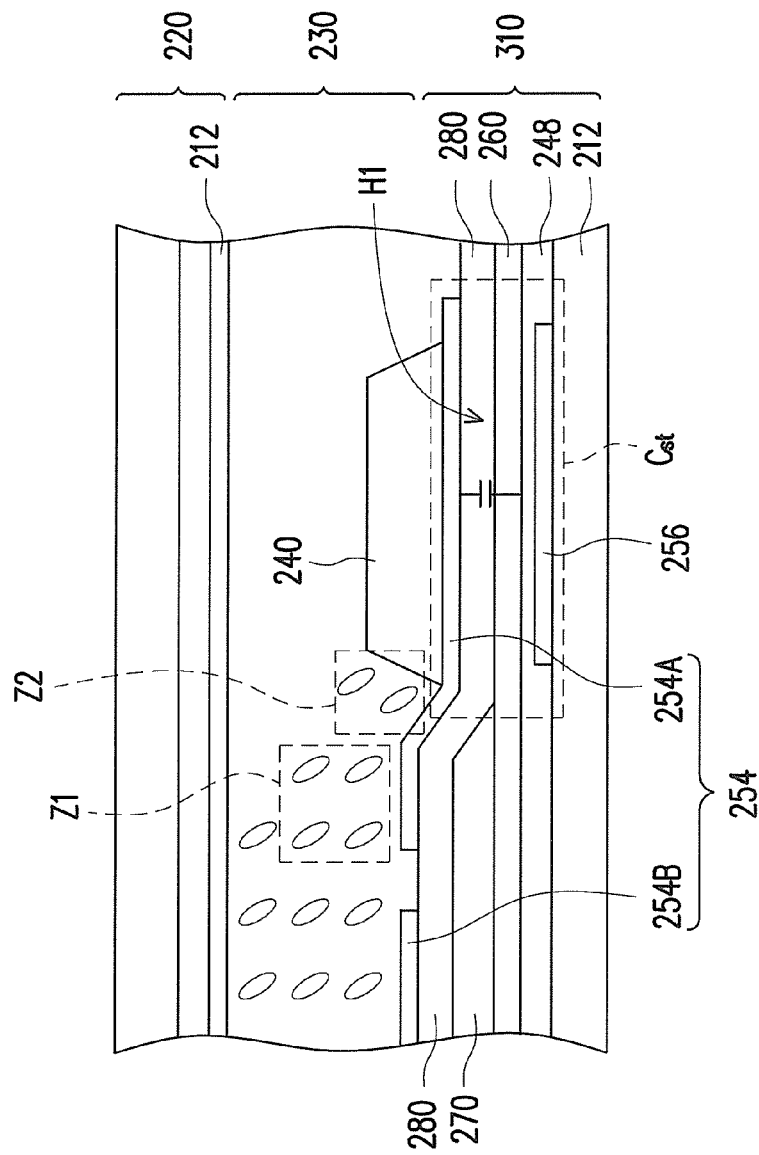
FIG. 3A"

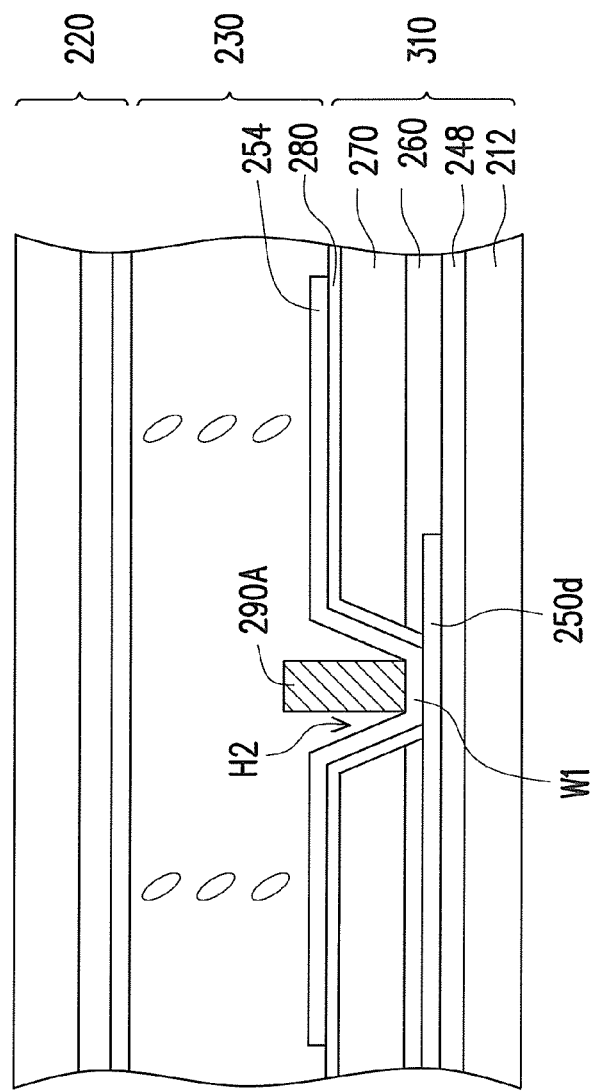
FIG. 3B″

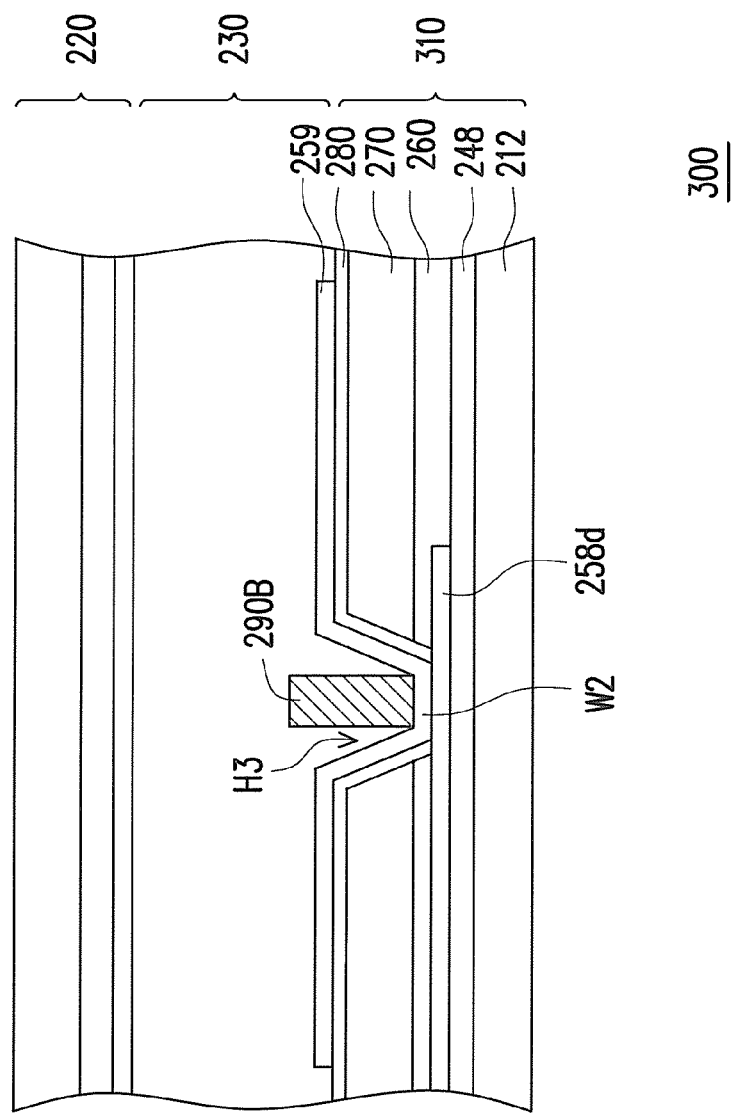
FIG. 5A"

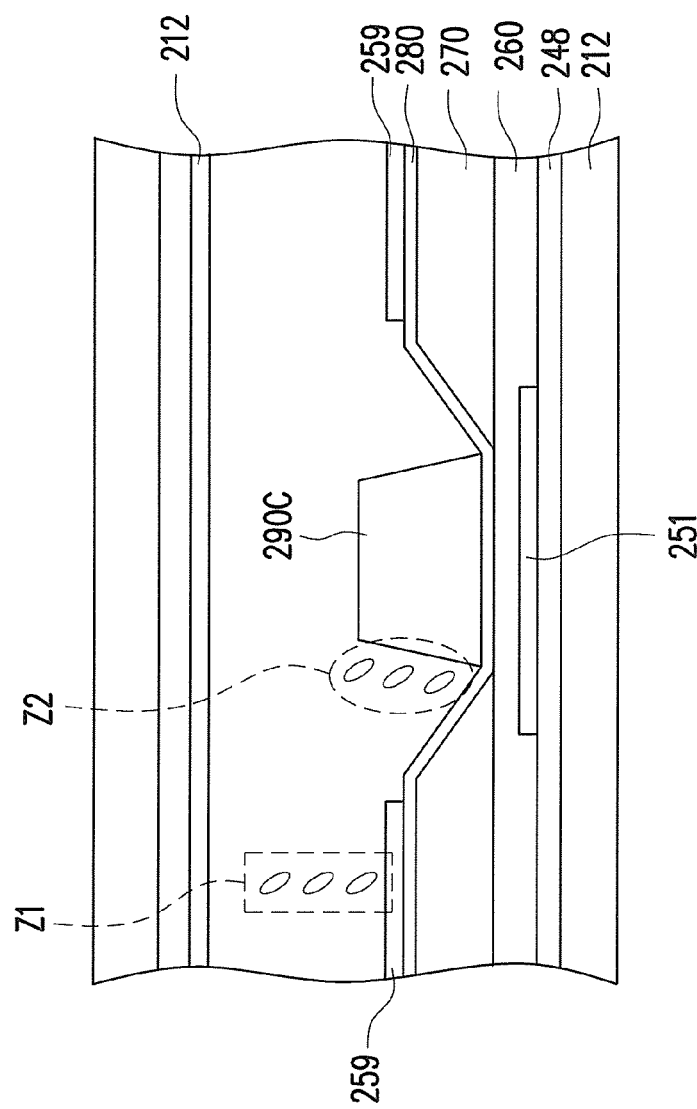
FIG. 5B"

LIQUID CRYSTAL DISPLAY

CROSS-REFERENCE TO RELATED APPLICATION

This application claims the priority benefit of Taiwan application serial no. 98143386, filed Dec. 17, 2009. The entirety of the above-mentioned patent application is hereby incorporated by reference herein and made a part of specification.

BACKGROUND OF THE INVENTION

1. Field of the Invention

The invention relates to a display apparatus, and more particularly, to a liquid crystal display (LCD).

2. Description of Related Art

With advantages of high definition, small volume, light weight, low driving voltage, low power consumption, and extensive range of application, liquid crystal display (LCD) has become a mainstream among various display products. The conventional LCD panel is constituted by a color filter substrate, a thin film transistor (TFT) array substrate, and a liquid crystal layer sandwiched therebetween. However, this LCD panel has low resolution and pixels thereof have low aperture ratio. Moreover, misalignment easily occurs when bonding the color filter substrate and the TFT array substrate. Recently, techniques including color filter on array (COA) and black matrix on array (BOA) have been proposed. Specifically, a COA substrate or a BOA substrate is assembled with an opposite substrate without having a color filter layer or a black matrix layer formed thereon. Liquid crystal (LC) molecules are then filled between the two substrates to form an LCD. Since the color filter layer is formed on the TFT array substrate directly, misalignment almost does not occur. Further, this LCD panel has superior resolution and the pixels thereof have high aperture ratio.

FIG. 1 shows a partial cross-sectional view of a storage capacitor of a pixel in a conventional LCD. As shown in FIG. 1, an LCD 100 includes a TFT array substrate 110, an opposite substrate 120, and an LC layer 130. Here, the TFT array substrate 110 has a color filter layer 150 disposed between a pixel electrode 140 and a substrate 112. It should be noted that in the LCD, in order to increase the capacitance of the storage capacitor of the pixel, the color filter layer 150, which is disposed above a capacitor electrode 142 of the pixel, is usually removed entirely to reduce a distance between the pixel electrode 140 and the capacitor electrode 142 for increasing the capacitance of the storage capacitor of the pixel.

Nevertheless, an excavated region of the color filter layer 150 on the TFT array substrate 110 forms into a recess region (i.e. an X part in FIG. 1). Thus, the amount of LC molecules has to be increased during the filling to fill the recess region. Also, defects such as bubbles are easily generated in the recess region during the process of filling LC molecules, and this consequently leads to mura. In addition, since orientation of the LC molecules is hard to be controlled due to the taper of the color filter layer 150, disclination phenomenon (i.e. a Y part in FIG. 1) of the LCD 100 occurs. Furthermore, the taper of the color filter layer 150 also leads to light leakage phenomenon, contrast ratio reduction, and poor display quality.

SUMMARY OF THE INVENTION

The invention is directed to a liquid crystal display (LCD) having reduced amount of a liquid crystal (LC) material, less disclination phenomenon, and enhanced display quality.

The invention is directed to an LCD including an active device array substrate, an opposite substrate, an LC layer, and a plurality of spacers. The active device array substrate includes a substrate, a plurality of pixels, a first dielectric layer, and a plurality of color filter patterns. The pixels are disposed on the substrate, and each pixel includes a first active device, a first pixel electrode, and a capacitor electrode. The first pixel electrode is electrically connected to the first active device. The capacitor electrode and the first pixel electrode constitute a storage capacitor. The first dielectric layer is disposed on the substrate to cover the first active devices. The color filter patterns are disposed on the first dielectric layer. Here, each color filter pattern respectively has a first opening above the capacitor electrode to expose the first dielectric layer above the capacitor electrode, and each first pixel electrode is respectively disposed on one of the color filter patterns and within a corresponding first opening. The opposite substrate is disposed above the active device array substrate. The LC layer is sandwiched between the active device array substrate and the opposite substrate. The spacers are disposed within the first openings.

In one embodiment of the invention, the first dielectric layer has a plurality of first contact windows, and each first pixel electrode respectively electrically connects with one of the first active devices through one of the first contact windows. The LCD further includes a plurality of first protrusions. Herein, each color filter pattern respectively has a second opening disposed above the first contact window, and each first protrusion is disposed within one of the second openings respectively.

In one embodiment of the invention, the LCD further includes a second dielectric layer covering the color filter patterns and the first dielectric layer exposed by the first openings. The first pixel electrodes are disposed on the second dielectric layer. For example, the second dielectric layer is in contact with the first dielectric layer through the first openings.

In one embodiment of the invention, each pixel further includes a second active device and a second pixel electrode. The second pixel electrode and the second active device are electrically connected, and the first pixel electrode and the second pixel electrode are electrically insulated from each other. The first dielectric layer further covers the second active device, for example, and the second pixel electrode is disposed on the color filter patterns, for example.

In one embodiment of the invention, the first dielectric layer has a plurality of second contact windows, and each second pixel electrode electrically connects with one of the second active devices respectively through one of the second contact windows. The LCD further includes a plurality of second protrusions. Herein, each color filter pattern respectively has a third opening disposed above the second contact window, and each second protrusion is disposed within one of the third openings respectively.

In one embodiment of the invention, the LCD further includes at least one third protrusion disposed between the color filter patterns. The third protrusion is, for instance, a strip-shaped spacer.

In one embodiment of the invention, the opposite substrate includes a common electrode.

In light of the foregoing, the spacers of the present application are disposed in a region which is a recessed non-display region. The present application facilitates in reducing the amount of the LC material used. The spacers also improve the disclination phenomenon of LC molecules in the display region, reduce light leakage, increase contrast ratio, and enhance display quality.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2A:
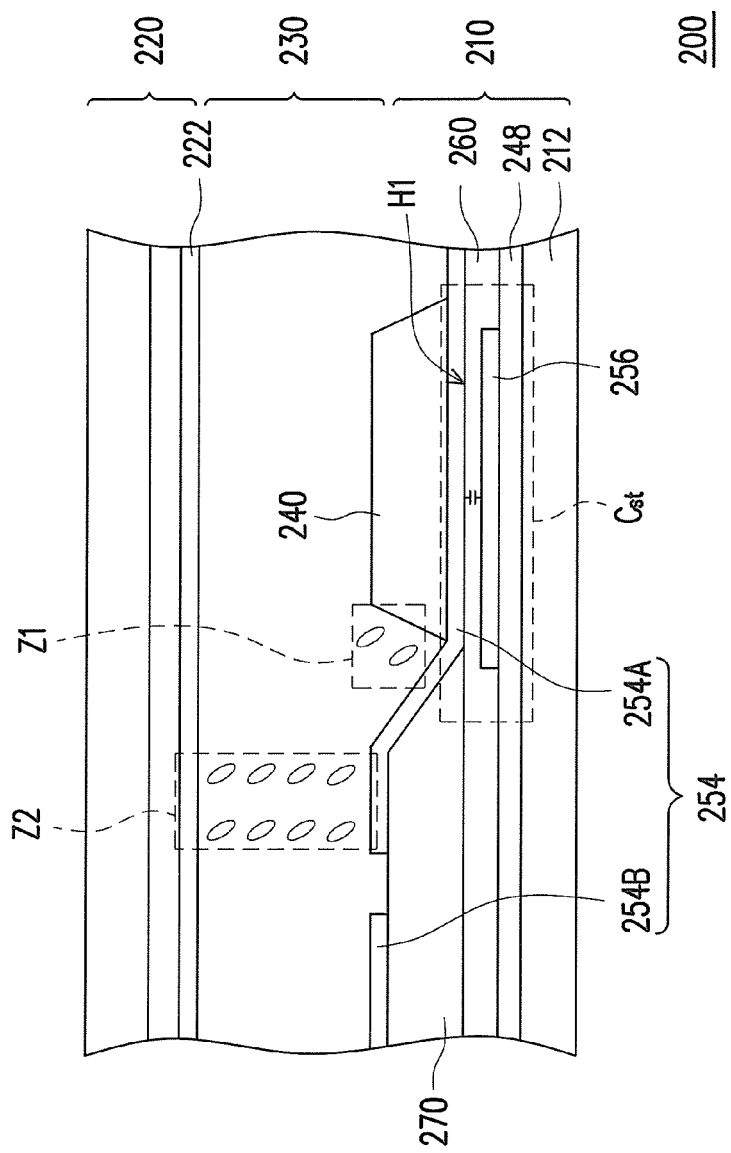
FIG. 2A' and 2A" are schematic cross-sectional views respectively showing an LCD according to an embodiment of the invention.

FIG. 2A' is a schematic cross-sectional view of a liquid crystal display (LCD) according to an embodiment of the invention. Referring to FIG. 2A', the LCD 200 of the present embodiment includes an active device array substrate 210, an opposite substrate 220, an LC layer 230, and a plurality of spacers 240. The opposite substrate 220 is disposed above the active device array substrate 210 and has a common electrode 222. The LC layer 230 is sandwiched between the active device array substrate 210 and the opposite substrate 220. In the LCD 200 of the invention, the spacers 240 are disposed on specific positions on the active device array substrate 210 having color filter patterns to partially fill a recess caused by an excavation of the color filter patterns so as to decrease the amount of LC molecules used and improve the disclination phenomenon. The active device array substrate 210 shown in FIG. 2A' is taken as an example for a detailed illustration.

Figure 2B:
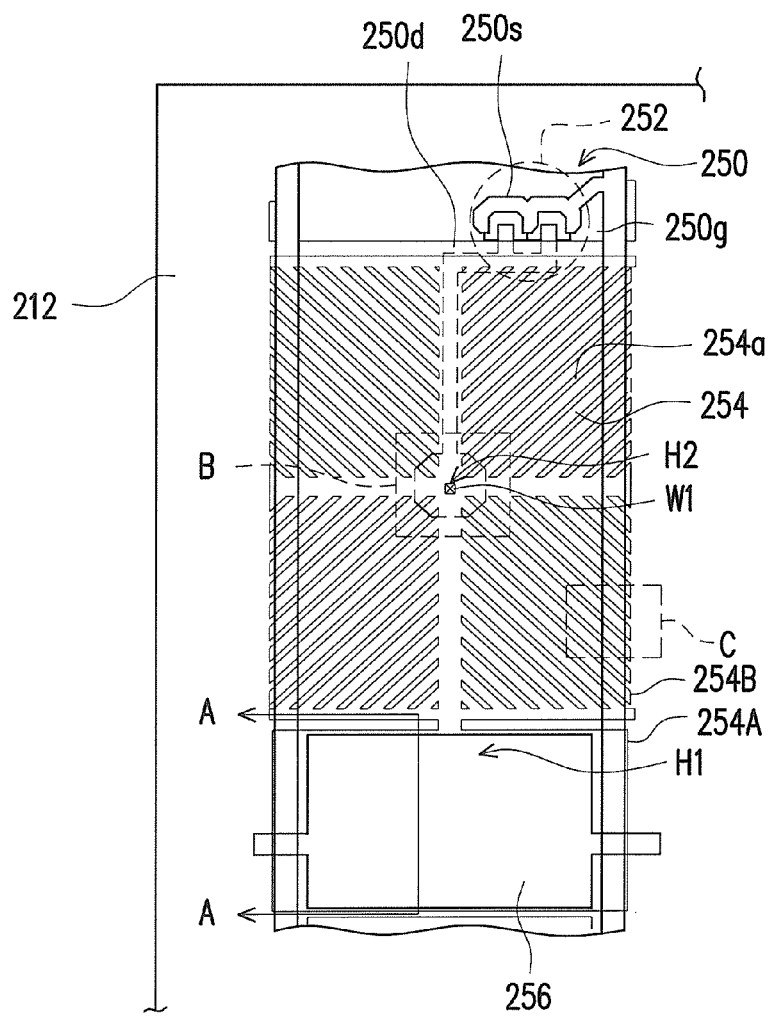
FIG. 2B is a top view of the LCD as shown in FIG. 2A'.

FIG. 2B is a top view of an LCD in FIG. 2A'. In order to describe more clearly, FIG. 2B merely depicts a top view of the active device array substrate 210 in the LCD 200 and omits illustrations of films such as the opposite substrate 220, the LC layer 230, and the spacers 240. Moreover, the active device array substrate 210 in FIG. 2A' is deemed as a cross-sectional view of FIG. 2B taken along a line AA. Referring to FIG. 2A' and FIG. 2B', the active device array substrate 210 of the present embodiment includes a substrate 212, a plurality of pixels 250, a first dielectric layer 260, and a plurality of color filter patterns 270. Only a pixel 250 is illustrated in FIG. 2B for a detailed illustration. The pixel 250 is disposed on the substrate 212. Each pixel 250 includes a first active device 252, a first pixel electrode 254, and a capacitor electrode 256. The first dielectric layer 260 is disposed on the substrate 212 to cover the first active device 252. The first dielectric layer 260, for example, is a passivation layer formed by dielectric materials such as silicon oxides, silicon nitride and so on. The first pixel electrode 254 is a transparent conductive layer formed by materials such as indium tin oxide (ITO) or indium zinc oxide (IZO), for instance. In the present embodiment, a gate insulation layer 248 is sandwiched between the first dielectric layer 260 and the substrate 212. Here, the active device 252 utilizes two transistors as an exemplary embodiment; however, the invention is not limited thereto, and one transistor or more than two transistors can also be adopted. Further, each transistor has a source, a drain, and a gate. The source is connected to a data line (not shown), the drain is connected to a pixel electrode 254, and the gate is connected to a scan line (not shown). In addition, the scan line and the data line are intersected and to formed a region as the pixel 250. In the present embodiment, the first pixel electrode 254 has a plurality of branches 254a extending outwardly. The first pixel electrode 254 is electrically connected to the first active device 252. In other words, the drain of the first active device 252 is connected to the first pixel electrode 254, and a storage capacitor Cst is formed by the first pixel electrode 254, the first dielectric layer 260, and the capacitor electrode 256. In details, the first pixel electrode 254 of the present embodiment has a capacitor electrode portion 254A disposed above and overlapped with the capacitor electrode 256. Thus, the capacitor electrode portion 254A of the first pixel electrode 254, the first dielectric layer 260, and the capacitor electrode 256 constitute a storage capacitor Cst of a Metal/Insulator/ITO (MII) type.

Referring to FIG. 2A' and FIG. 2B, the color filter pattern 270 of the active device array substrate 210 is disposed on the first dielectric layer 260. In other words, in the active device array substrate 210 of the present embodiment, the color filter pattern 270 is integrated on the active device array substrate, so-called color filter on array (COA) technology. Specifically, each of the color filter patterns 270 respectively has a first opening H1 disposed above the capacitor electrode 256 to expose the first dielectric layer 260 above the capacitor electrode 256 or at least one of the color filter patterns 270 has a first opening H1 disposed above the capacitor electrode 256 to expose the first dielectric layer 260 above the capacitor electrode 256. Each of the first pixel electrodes 254 is respectively disposed on one of the color filter patterns 270 and within the corresponding first opening H1. In details, the first pixel electrode 254 is divided into a display portion 254B and the capacitor electrode portion 254A. Here, the LC molecules disposed above the display portion 254B tilt in different degrees according to a voltage difference between the display portion 254B and the common electrode 222 for display. The capacitor electrode portion 254A of the first pixel electrode 254 overlaps with the capacitor electrode 256 for forming the storage capacitor Cst so as to maintain the voltage of the first pixel electrode 254.

Specifically, as shown in FIG. 2A' and FIG. 2B, the invention utilizes the spacer 240 disposed within the first opening H1. The spacer 240 generally fills the space resulted from the excavation of the color filter pattern 270. The amount of the LC material used is then significantly decreased to reduce fabrication cost. On the other hand, the fabrications of the spacers 240 and the original supporting spacers (not shown) are compatible. Here, the supporting spacers (not shown) are configured to maintain the space between the active device array substrate 210 and the opposite substrate 220. Thus, the designer only needs to further form the spacer 240 at the first opening H1 simultaneously, and no additional fabrication process is required. Moreover, the shape of the spacers 240 can be determined through pattern of masks. As shown in FIG. 2A', since the LC molecules orient along an edge of the spacer, orientation of the LC molecules near a ramp on a side of the spacer (i.e. Z1) and orientation of the LC molecules in other regions (i.e. Z2) are made more identical by suitably adjusting the ramp on the side of the spacer. Therefore, the rapid change of the orientation of the LC molecules near the first opening H1 is alleviated by suitably adjusting the ramp of the spacers 240, the disclination phenomenon is prevented, light leakage is reduced, and contrast ratio is increased to enhance display quality.

Referring to FIG. 2B and FIG. 2A', it should be noted that the capacitor electrode 256 and a source 250s and a drain 250d of the first active device 252, for example, are fabricated by the same film (i.e. a second metal layer). other words, the capacitor electrode 256 and the source 250s and the drain 250d of the first active device 252 can be fabricated using the same mask. At this time, the capacitor electrode 256 is sandwiched between the gate insulating layer 248 and a second dielectric layer 280.

Obviously, referring to FIG. 2A", the capacitor electrode 256 and a gate 250g of the first active device 252, for example, can also be fabricated by the same film (i.e. the first metal layer). In other words, the capacitor electrode 256 and the gate 250g of the first active device 252 can be fabricated using the same mask. At this time, the capacitor electrode 256 is sandwiched between the substrate 212 and the gate insulating layer 248. That is, the first pixel electrode 254, the first dielectric layer 260, the gate insulating layer 248, and the capacitor electrode 256 are stacked from the top (the first pixel electrode 254) to the bottom (the capacitor electrode 256) to constitute a storage capacitor Cst. In details, the first pixel electrode 254 of the present embodiment has the capacitor electrode portion 254A disposed above and overlapped with the capacitor electrode 256. Thus, the capacitor electrode portion 254A of the first pixel electrode 254, the first dielectric layer 260, the gate insulating layer 248, and the capacitor electrode 256 form a storage capacitor Cst of an MII type.

Figure 3A:
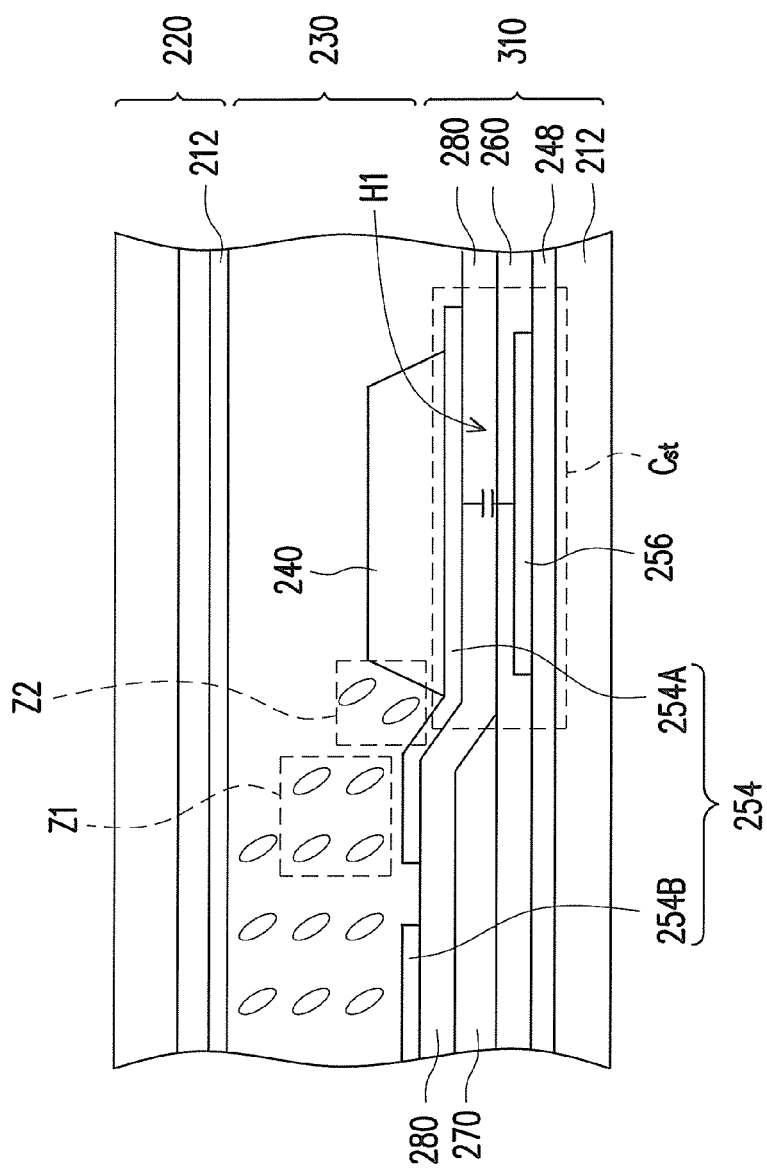
FIG. 3A' and 3A" are schematic cross-sectional views respectively showing another LCD according to an embodiment of the invention.

FIG. 3A' is a schematic cross-sectional view of another LCD according to an embodiment of the invention. Herein, FIG. 3A' is a variation of FIG. 2A'. Referring to FIG. 3A', the second dielectric layer 280 can be further disposed between the color filter pattern 270 and the first pixel electrode 254 to protect the color filter pattern 270, so that the color filter pattern 270 is not affected by the subsequent fabrication easily (such as the patterning process of the pixel electrode or the solvent in the LC layer 230). The second dielectric layer 280 is, for example, a transparent overcoat layer. The second dielectric layer 280 covers the color filter pattern 270 and the first dielectric layer 260 exposed by the first opening Hl. The first pixel electrode 254 is disposed on the second dielectric layer 280. As shown in FIG. 3A, the second dielectric layer 280 is in contact with the first dielectric layer 260 through the first opening Hl. In the present embodiment, the capacitor electrode portion 254A of the first pixel electrode 254, the first dielectric layer 260, the second dielectric layer 280, and the capacitor electrode 256 constitute the storage capacitor Cst. In addition, the gate insulating layer 248 is sandwiched between the first dielectric layer 260 and the substrate 212. In other words, the gate insulating layer 248 is disposed on a surface of the substrate 212 and disposed under the first dielectric layer 260 and the capacitor electrode 256.

Referring to FIG. 2B and FIG. 3A', it should be noted that the capacitor electrode 256 and the source 250s and the drain 250d of the first active device 252, for example, are fabricated by the same film (i.e. the second metal layer). In other words, the capacitor electrode 256 and the source 250s and the drain 250d of the first active device 252 can be fabricated using the same mask. At this time, the capacitor electrode 256 is sandwiched between the gate insulating layer 248 and the second dielectric layer 280.

Obviously, referring to FIG. 3A", the capacitor electrode 256 and the gate 250g of the first active device 252, for example, can also be fabricated by the same film (i.e. all on the first metal layer). In other words, the capacitor electrode 256 and the gate 250g of the first active device 252 can be fabricated using the same mask. At this time, the capacitor electrode 256 is sandwiched between the substrate 212 and the gate insulating layer 248. That is, the first pixel electrode 254, the second dielectric layer 280, the first dielectric layer 260, the gate insulating layer 248, and the capacitor electrode 256 are stacked from the top (the first pixel electrode 254) to the bottom (the capacitor electrode 256) to constitute a storage capacitor Cst. In details, the first pixel electrode 254 of the present embodiment has the capacitor electrode portion 254A disposed above and overlapped with the capacitor electrode 256. Thus, the capacitor electrode portion 254A of the first pixel electrode 254, the second dielectric layer 280, the first dielectric layer 260, the gate insulating layer 248, and the capacitor electrode 256 constitute a storage capacitor Cst of an MII type.

Figure 3B:
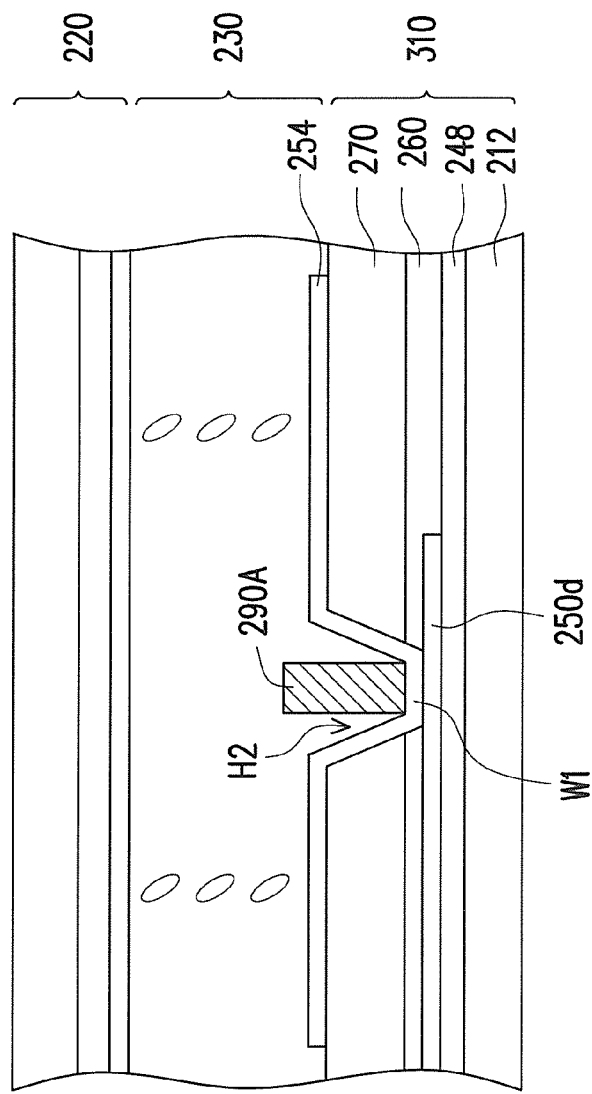
FIG. 3B' and FIG. 3B" are partially enlarged cross-sectional views respectively showing a B part in FIG. 2B.

FIG. 3B' is a partially enlarged cross-sectional view of a B part in FIG. 2B. Referring to FIG. 2B and FIG. 3B' simultaneously, in the present embodiment, the first dielectric layer 260 has a plurality of first contact windows W1. The first pixel electrode 254 is electrically connected to the drain 250d of the first active device 252 through the first contact window W1. In the present embodiment, the gate insulating layer 248 is sandwiched between the first dielectric layer 260 and the substrate 212. In other words, the gate insulating layer 248 is disposed on the surface of the substrate 212 and disposed under the first dielectric layer 260. The LCD 200 further includes a plurality of first protrusions 290A. In details, each color filter pattern 270 respectively has a second opening H2 disposed above the first contact window W1, and each first protrusion 290A is disposed within one of the second openings H2 respectively. Similarly, in the present embodiment, the first protrusions 290A, the spacers 240, and the supporting spacers can be fabricated in the same fabricating process; thus no additional fabrication is required. Furthermore, by suitably adjusting the ramp on the side of the spacers, the orientation of the LC molecules near the ramp on the side of the spacer (i.e. Z1) and orientation of the LC molecules in other regions (i.e. Z2) are made more identical. The first protrusion 290A filled in the second opening H2 reduces the amount of LC molecules used and the first protrusion 290A facilitates in uniformizing the orientation of the LC molecules above, so as to reduce the disclination phenomenon during display.

Referring to FIG. 3B", the second dielectric layer 280 can obviously be further disposed between the color filter pattern 270 and the first pixel electrode 254 to protect the color filter pattern 270, such that the color filter pattern 270 is not affected by the subsequent fabrication (such as the patterning process of the pixel electrode or the solvent in the LC layer 230). That is, the second dielectric layer 280 is conformally formed on the color filter pattern 270 and exposes the drain 250d of the first active device 252 under the first contact window W1. The first pixel electrode 254 is then formed on the second dielectric layer 280, the first contact window W1, and a portion of the drain 250d of the first active device 252 exposed by the first contact window Wl.

Figure 3C:
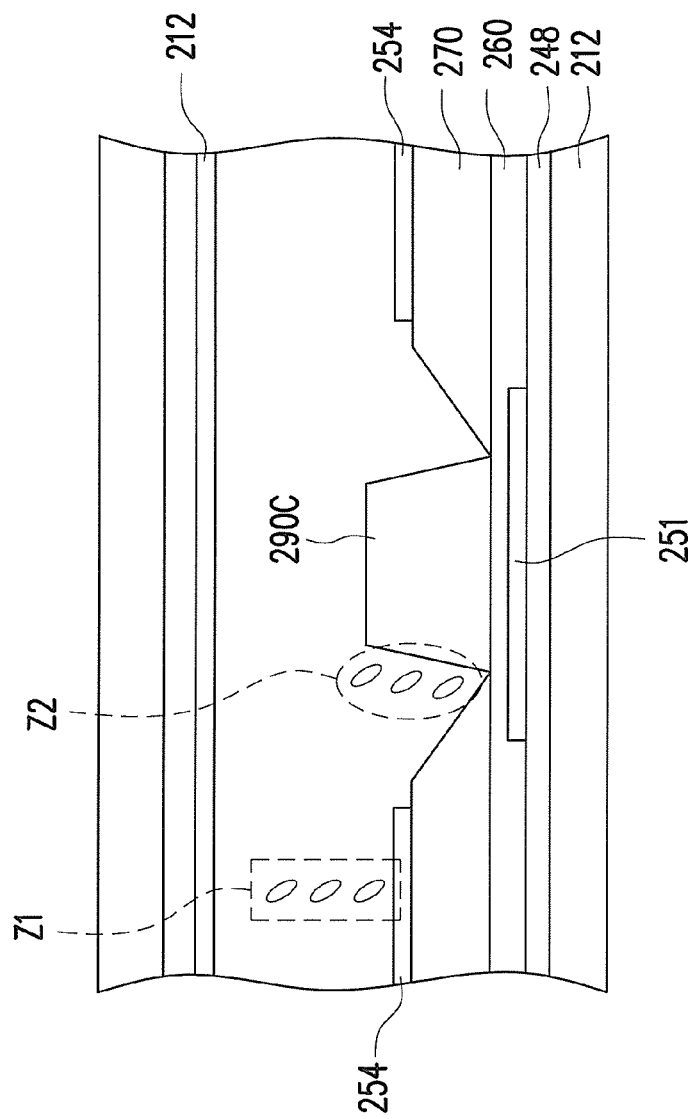
FIG. 3C' is a partially enlarged cross-sectional view of a C part in FIG. 2B.

FIG. 3C' is a partially enlarged cross-sectional view of a C part in FIG. 2B. Referring to FIG. 2B and FIG. 3C' simultaneously, in the present embodiment, a third protrusion 290C is further disposed between the color filter patterns 270 above a signal line as shown in FIG. 3C'. In details, the third protrusion 290C is, for example, disposed above the data line and/or the scan line. In the present embodiment, the third protrusion 290C is disposed above a data line 251 for illustration. As shown in FIG. 2B and FIG. 3C', the color filter pattern 270 exposes the first dielectric layer 260 above the data line 251 between the neighboring pixels 250. In the present embodiment, a gate insulating layer 248 is disposed between the first dielectric layer 260 and the substrate 212. The third protrusion 290C is disposed above the data line 251 and on the first dielectric layer 260 exposed by the color filter pattern 270. The third protrusion 290C is described in details in the following. Similarly, the amount of the LC molecules used can be further reduced by utilizing the third protrusion 290C filled between neighboring color filter patterns 270. The third protrusion 290C also facilitates in uniformizing the orientation of the LC molecules above so as to reduce the disclination phenomenon during display.

Hence, the designer can utilize the concept described in the embodiments aforementioned according to actual demands of the product and dispose the spacers within the first openings of the color filter patterns to reduce the amount of the LC molecules used and improve the disclination phenomenon. The designer can also incorporate following embodiments on the foundation of the aforementioned embodiments to further decrease the amount of the LC molecules used and further improve the disclination phenomenon.

Figure 1:
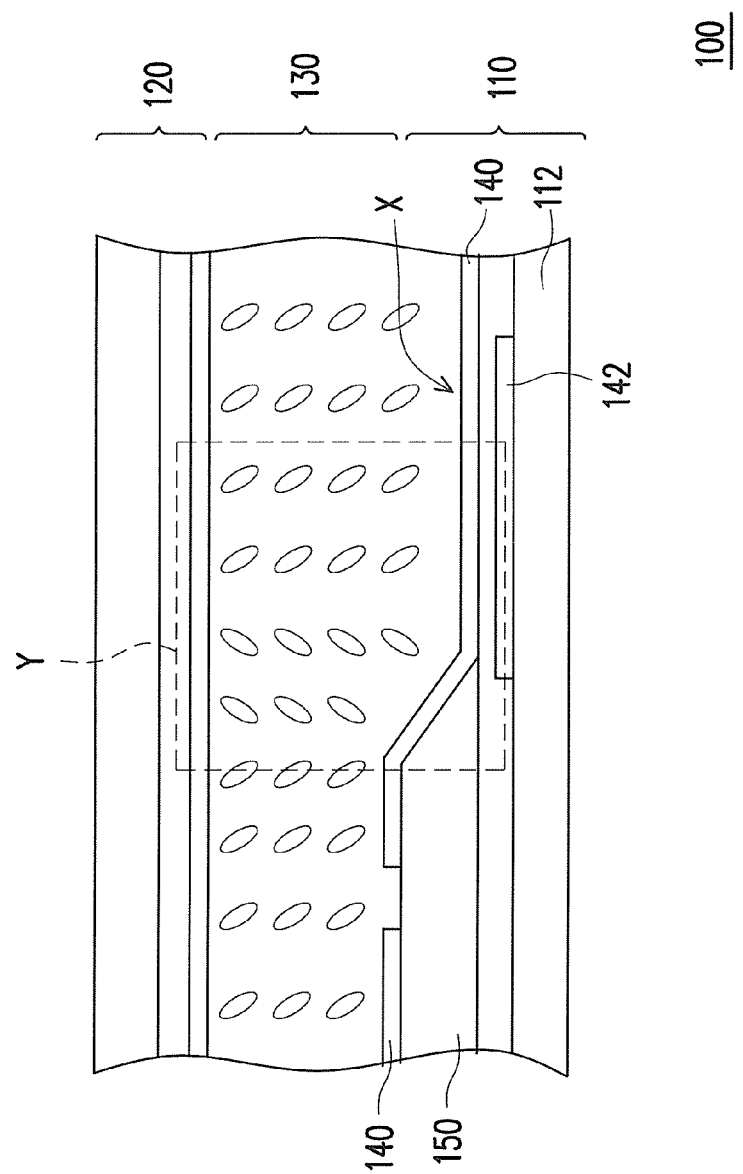
FIG. 1 shows a partial cross-sectional view of a storage capacitor of a pixel in a conventional liquid crystal display (LCD).
Figure 4:
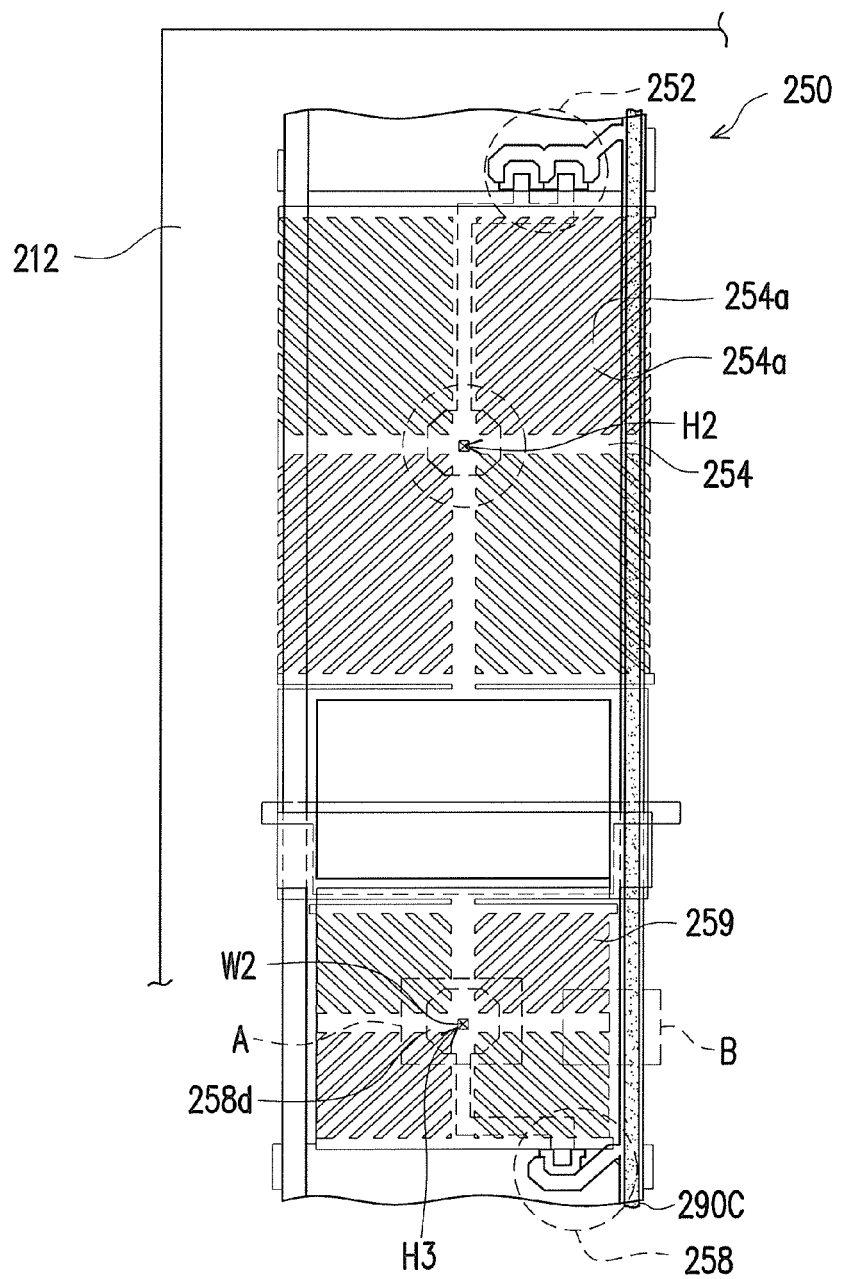
FIG. 4 is a top view illustrating an LCD according to an embodiment of the invention.
Figure 5A:
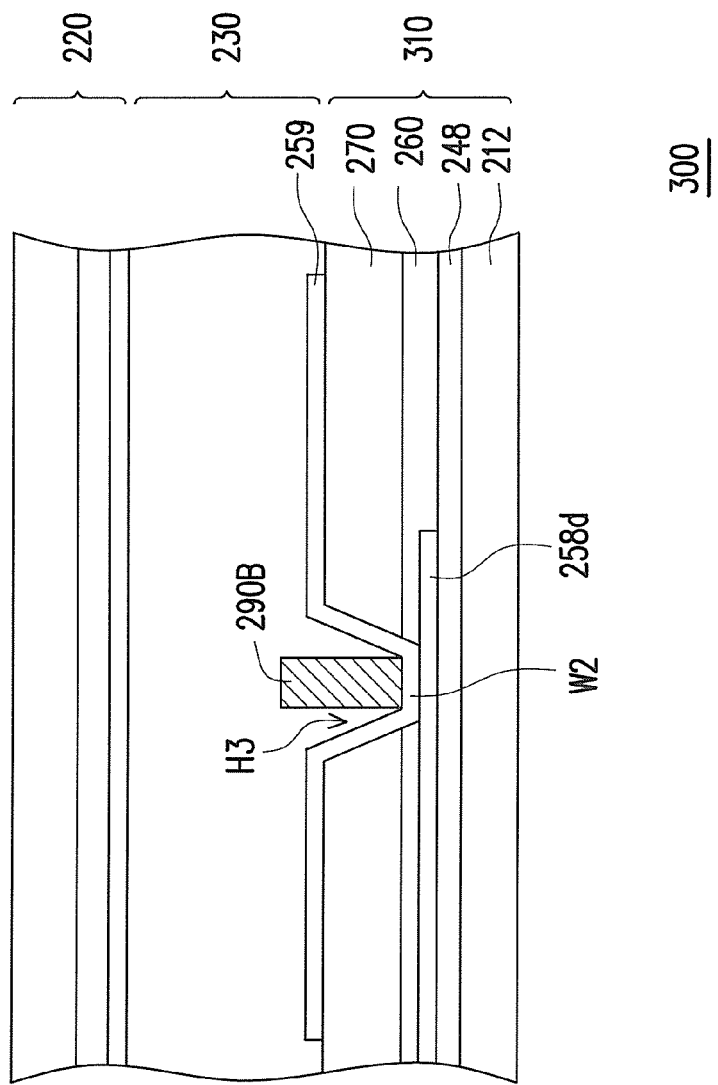
FIG. 5A' and FIG. 5A" are partially enlarged cross-sectional views respectively showing an A part in FIG. 4.

For example, FIG. 4 is a top view of an LCD in one embodiment of the invention. For better illustration, FIG. 4 merely illustrates a top view of the active device array substrate in the LCD and omits the illustrations of the opposite substrate, the LC layer and so on. FIG. 5A' is a partially enlarged cross-sectional view of an A part in FIG. 4. Referring to both FIGS. 4 and 5A', an LCD 300 of the present embodiment is similar to the LCD 200 of FIG. 4. The same element reference labels in FIG. 5A' represent the same elements as those in FIG. 1, and thus are not to be reiterated herein. Nevertheless, in an active device array substrate 310 of the present embodiment, each pixel 250 further includes a second active device 258 and a second pixel electrode 259. The second pixel electrode 259 and the second active device 258 are electrically connected, and the first pixel electrode 254 and the second pixel electrode 259 are insulated from each other. Considering from an aspect of the application, the first pixel electrode 254 having a higher aperture ratio is adopted as a main display unit while the second pixel electrode 259 is adopted as a sub display unit, and the invention is not limited thereto. The first dielectric layer 260 further covers the second active device 258, as shown in FIG. 5A'. By covering a second drain 258d of the second active device 258 with the first dielectric layer 260 means that the first dielectric layer 260 covers the second active device 258, and the second pixel electrode 259 is disposed on the color filter pattern 270. In the present embodiment, the gate insulating layer 248 is sandwiched between the first dielectric layer 260 and the substrate 212. In other words, the gate insulating layer 248 is disposed on a surface of the substrate 212 and disposed under the first dielectric layer 260 and the drain 258d of the second active device 258.

Referring to FIG. 4 and FIG. 5A', the first dielectric layer 260 has a plurality of second contact windows W2, and each second pixel electrode 259 respectively electrically connects with one of the second active devices 258 through one of the second contact windows W2. The LCD 300 further includes a plurality of second protrusions 290B. In details, each color filter pattern 270 respectively has a third opening H3 disposed above the second contact window W2, and each second protrusion 290B is disposed within one of the third openings H3 respectively. Similarly, the second protrusions 290B of the present embodiment can be fabricated in the same fabrication with the first protrusions 290A, the spacers 240, and supportive spacers aforementioned; thus, additional fabrication is not required. Further, heights of the spacers 240, the first protrusions 290A, and the second protrusions 290B can be the same or different depending on product demands. Accordingly, the second protrusion 290B filled within the third opening H3 further decreases the amount of the LC molecules used. The second protrusion 290B also facilitates in uniformizing the orientation of the LC molecules above so as to reduce the disclination phenomenon during display.

Referring to FIG. 5A", the second dielectric layer 280 can obviously be further disposed between the color filter pattern 270 and the second pixel electrode 259 to protect the color filter pattern 270, such that the color filter pattern 270 is not affected by the subsequent fabrication (such as the patterning process of the pixel electrode or the solvent in the LC layer 230). That is, the second dielectric layer 280 is conformally formed on the color filter layer 270 and exposes the drain 258d of the second active device 258 under the second contact window W2. The second pixel electrode 259 is then formed on the second dielectric layer 280, the second contact window W2, and a portion of the drain 258d of the second active device 258 exposed by the second contact window W2.

Figure 5B:
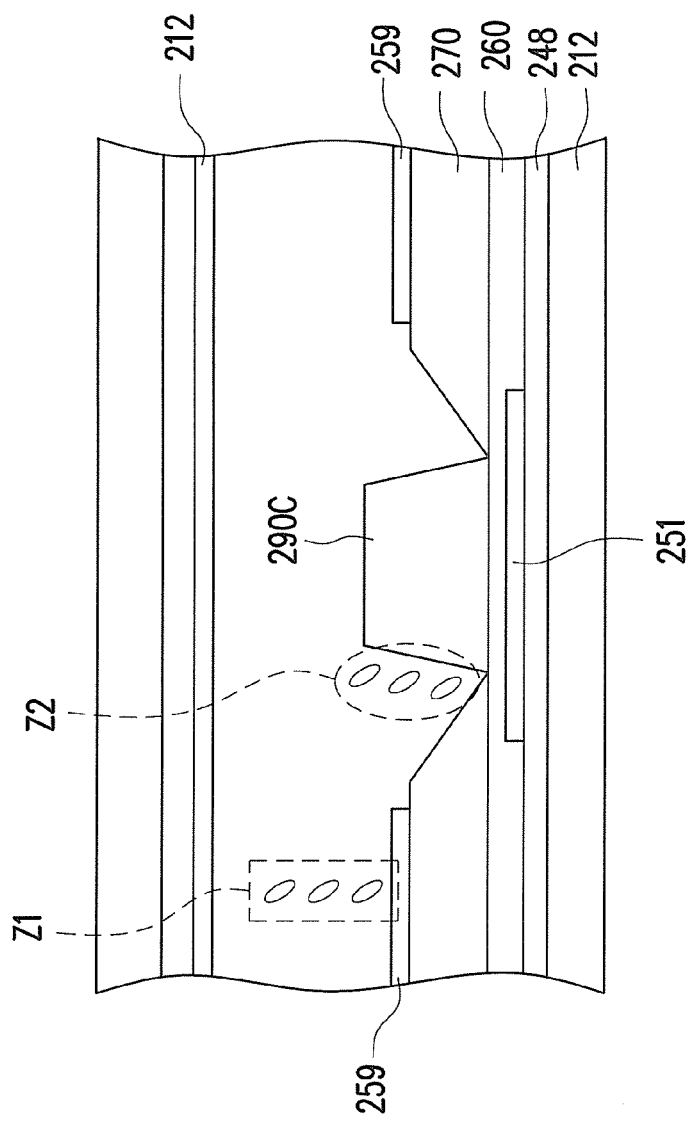
FIG. 5B' and FIG. 5B" are partially enlarged cross-sectional views respectively showing a B part in FIG. 4.

FIG. 5B' is a partially enlarged cross-sectional view of a B part in FIG. 4. Referring to FIG. 4 and FIG. 5B' simultaneously, in the present embodiment, the third protrusion 290C is further disposed between the color filter patterns 270 above the signal line. Specifically, the third protrusion 290C is, for example, disposed above the data line and/or the scan line. In the present embodiment, the third protrusion 290C is disposed above the data line 251 for illustration. As shown in FIG. 4 and FIG. 5B', the color filter pattern 270 exposes the first dielectric layer 260 above the data line 251 between the neighboring pixels 250. In the present embodiment, a gate insulating layer 248 is disposed between the first dielectric layer 260 and the substrate 212. The third protrusion 290C is disposed above the data line 251 and on the first dielectric layer 260 exposed by the color filter pattern 270. As observed from the top view, the third protrusion 290C is strip-shaped as shown in FIG. 4. Thus, the third protrusion of the present embodiment is referred as a strip-shaped spacer. Similarly, the third protrusions 290C of the present embodiment can be fabricated in the same fabrication with the first protrusions 290A, the second protrusions 290B, the spacers 240, and supportive spacers aforementioned; thus, additional fabrication is not required. Further, heights of the spacers 240, the first protrusions 290A, the second protrusions 290B, and the third protrusions 290C can be the same or different depending on product demands. Accordingly, the third protrusion 290C filled between the neighboring color filter patterns 270 further decreases the amount of the LC molecules used. The third protrusion 290C also facilitates in uniformizing the orientation of the LC molecules above so as to reduce the disclination phenomenon during display.

Referring to FIG. 5B", the second dielectric layer 280 can obviously be further disposed between the color filter pattern 270 and the second pixel electrode 259 to protect the color filter pattern 270, such that the color filter pattern 270 is not affected by the subsequent fabrication (such as the patterning process of the pixel electrode or the solvent in the LC layer 230). In the present embodiment, the gate insulating layer 248 and the second dielectric layer 280 are disposed the third protrusion 290C and the data line 251.

In summary, in the LCD of the invention, the spacers are filled in the excavated portion of the color filter pattern of the active device array substrate, which consequently reduces the amount of the LC molecules used. On the other hand, in some embodiments, the shape and the ramp of the spacers can be adjusted to improve the disclination phenomenon. Hence, the LCD of the invention effectively solves the problem of the excessive amount of the LC molecules used and the disclination phenomenon in the conventional art, such that an LCD with high quality can be fabricated with low fabrication cost.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A liquid crystal display, comprising:
   an active device array substrate, comprising:
      a substrate;
      a plurality of pixels disposed on the substrate, wherein each of the pixels comprises:
         a first active device;
         a first pixel electrode, electrically connected to the first active device;
         a capacitor electrode, wherein the capacitor electrode and the first pixel electrode constitute a storage capacitor;
      a first dielectric layer disposed on the substrate to cover the first active devices;
      a plurality of color filter patterns disposed on the first dielectric layer, wherein each of the color filter patterns respectively has a first opening above the capacitor electrode to expose the first dielectric layer above the capacitor electrode, and each of the first pixel electrodes is respectively disposed on one of the color filter patterns and within a corresponding first opening;
   an opposite substrate disposed above the active device array substrate;
   a liquid crystal layer sandwiched between the active device array substrate and the opposite substrate, and the liquid crystal layer including a plurality of liquid crystal molecules; and
   a plurality of spacers disposed within the first openings, wherein a recess exists between a tapered sidewall of each of the spacers and each of the color filter patterns, and the tapered sidewall of each of the spacers affects the orientation of the liquid crystal molecules within the recess.

2. The liquid crystal display of claim 1, wherein the first dielectric layer has a plurality of first contact windows, and each of the first pixel electrodes respectively electrically connects with one of the first active devices through one of the first contact windows.

3. The liquid crystal display of claim 2, further comprising a plurality of first protrusions, wherein each of the color filter patterns respectively has a second opening disposed above the first contact window, and each of the first protrusions is disposed within one of the second openings respectively, wherein the first protrusions do not contact the opposite substrate.

4. The liquid crystal display of claim 1, further comprising a second dielectric layer covering the color filter patterns and the first dielectric layer exposed by the first openings, and the first pixel electrodes are disposed on the second dielectric layer.

5. The liquid crystal display of claim 4, wherein the second dielectric layer is in contact with the first dielectric layer through the first openings.

6. The liquid crystal display of claim 1, wherein each of the pixels further comprises:
   a second active device; and
   a second pixel electrode, electrically connected to the second active device, wherein the first pixel electrode and the second pixel electrode are electrically insulated from each other.

7. The liquid crystal display of claim 6, wherein the first dielectric layer further covers the second active devices, and the second pixel electrodes are disposed on the color filter patterns.

8. The liquid crystal display of claim 7, wherein the first dielectric layer has a plurality of second contact windows, and each of the second pixel electrodes respectively electrically connects with one of the second active devices through one of the second contact windows.

9. The liquid crystal display of claim 8, further comprising a plurality of second protrusions, wherein each of the color filter patterns respectively has a third opening disposed above the second contact window, and each of the second protrusions is disposed within one of the third openings respectively.

10. The liquid crystal display of claim 1, further comprising at least one third protrusion disposed between the color filter patterns.

11. The liquid crystal display of claim 10, wherein the third protrusion is a strip-shaped spacer.

12. The liquid crystal display of claim 1, wherein the opposite substrate has a common electrode.

13. The liquid crystal display of claim 1, wherein the recess is located within the first opening.

14. The liquid crystal display of claim 1, wherein the spacers and the color filter patterns are not overlapped with each other.

15. A liquid crystal display, comprising:
   an active device array substrate, comprising:
      a substrate;
      a plurality of pixels disposed on the substrate, wherein each of the pixels comprises:
         a first active device;
         a first pixel electrode, electrically connected to a storage capacitor;
         a capacitor electrode, wherein the capacitor electrode and the first pixel electrode constitute the storage capacitor;
      a first dielectric layer disposed on the substrate to cover the first active devices;
      a plurality of color filter patterns disposed on the first dielectric layer, wherein at least one of the color filter patterns has an opening disposed above an electrode to expose the first dielectric layer above the electrode, and each of the first pixel electrodes is respectively disposed on one of the color filter patterns;
   an opposite substrate disposed above the active device array substrate;
   a liquid crystal layer sandwiched between the active device array substrate and the opposite substrate, and the liquid crystal layer including a plurality of liquid crystal molecules; and
   a plurality of protrusions disposed within the openings, wherein a recess exists between a tapered sidewall of each of the protrusions and each of the color filter patterns, and the tapered sidewall of each of the protrusions affects the orientation of the liquid crystal molecules within the recess.

16. The liquid crystal display of claimed 15, wherein a gate of the first active device is connected to a scan line, a source of the first active device is connected to a data line, a drain of the first active device is connected to the first pixel electrode, wherein the electrode is the scan line and/or the data line.

17. The liquid crystal display of claim 15, wherein the recess is located within the opening.

18. The liquid crystal display of claim 15, wherein the protrusions and the color filter patterns are not overlapped with each other.

19. A liquid crystal display, comprising:
an active device array substrate, comprising:
a first active device;
a first pixel electrode, electrically connected to a storage capacitor with the first active device;
a capacitor electrode, wherein the capacitor electrode and the first pixel electrode constitute the storage capacitor;
a first dielectric layer disposed on the substrate to cover the first active devices and having a contact window;
a plurality of color filter patterns disposed on the first dielectric layer, wherein at least one of the color filter patterns has an opening, and the opening substantially corresponds to the contact window, wherein the opening exposes an electrode and each of the first pixel electrodes is respectively disposed on one of the color filter patterns and within the opening;
an opposite substrate disposed above the active device array substrate;
a liquid crystal layer sandwiched between the active device array substrate and the opposite substrate; and
a plurality of protrusions disposed within the openings, wherein the protrusions do not contact the opposite substrate.

20. The liquid crystal display of claim 19, wherein the electrode is a source or a drain of the first active device.

21. The liquid crystal display of claim 19, wherein the protrusions and the color filter patterns are not overlapped with each other.

22. The liquid crystal display of claim 19, wherein the liquid crystal layer including a plurality of liquid crystal molecules, and a recess exists between a sidewall of each of the protrusions and each of the color filter patterns, and the sidewall of each of the protrusions affects the orientation of the liquid crystal molecules within the recess and the recess is located within the opening.

23. A liquid crystal display, comprising:
an active device array substrate, comprising:
a substrate;
a plurality of pixels disposed on the substrate, wherein each of the pixels comprises:
a first active device;
a first pixel electrode, electrically connected to a storage capacitor;
a capacitor electrode, wherein the capacitor electrode and the first pixel electrode constitute the storage capacitor;
a first dielectric layer disposed on the substrate to cover the first active devices;
a plurality of color filter patterns disposed on the first dielectric layer, wherein at least one of the color filter patterns has an opening disposed above an electrode to expose the first dielectric layer above the electrode, and each of the first pixel electrodes is respectively disposed on one of the color filter patterns;
an opposite substrate disposed above the active device array substrate;
a liquid crystal layer sandwiched between the active device array substrate and the opposite substrate; and
a plurality of protrusions disposed within the openings, and the protrusions and the color filter patterns are not overlapped with each other.

24. The liquid crystal display of claimed 23, wherein a gate of the first active device is connected to a scan line, a source of the first active device is connected to a data line, a drain of the first active device is connected to the first pixel electrode, wherein the electrode is the scan line and/or the data line.

* * * * *